United States Patent [19]

Fertis et al.

[11] Patent Number: 4,606,519
[45] Date of Patent: Aug. 19, 1986

[54] AIRFOIL

[76] Inventors: Demeter G. Fertis, 186 Court Dr., Apartment 301, Akron, Ohio 44313; Larry L. Smith, 5 Court St., Canfield, Ohio 44406

[21] Appl. No.: 637,908

[22] Filed: Aug. 6, 1984

[51] Int. Cl.$^4$ .............................................. B64C 3/26
[52] U.S. Cl. .................................................... 244/200
[58] Field of Search ........................ 244/198, 200, 207

[56] References Cited

U.S. PATENT DOCUMENTS

| | | | |
|---|---|---|---|
| 1,050,654 | 1/1913 | Holland | 244/200 |
| 1,746,140 | 2/1930 | Bobo | 244/200 |
| 1,831,780 | 11/1931 | Sharp | 244/198 |
| 1,846,328 | 2/1932 | Hampton | 244/198 |
| 2,959,377 | 11/1960 | Kaplar | 244/198 |
| 3,000,401 | 9/1961 | Ringleb | 244/200 |
| 3,010,680 | 11/1961 | Kaplan | 244/207 |
| 3,706,430 | 12/1972 | Kline et al. | 244/35 |
| 4,046,338 | 9/1977 | Kline et al. | 244/213 |

FOREIGN PATENT DOCUMENTS

| | | | |
|---|---|---|---|
| 456012 | 8/1913 | France | 244/200 |
| 192568 | 2/1923 | United Kingdom | 244/200 |

OTHER PUBLICATIONS

Morris, Scot, *Fancy Flights,* OMNI, Apr. 1984 at p. 64.

Nicolaides, J. D. and Ingram, C. W., "Lift and Drag Coefficients of a Semi-Wedge Airfoir", (undated).
*The Paper-Plane Caper,* TIME, Apr. 2, 1973 at p. 51.
DeLaurier, J. D. and Harris, J. M., "An Experimental Investigation of the Aerodynamic Characteristics of Stepped-Wedge Airfoils at Low Speeds", AIAA Paper No. 74-1015 (1974).
Lumsdaine, E., Johnson, W. S., Fletcher, L. M. and Peach, J. E., "Investigation of the Kline-Fogleman Airfoil Section for Rotor Blade Applications", Semi-Annual Report, Paper No. AE-74-1054, University of Tennessee (1974).

*Primary Examiner*—Galen Barefoot
*Attorney, Agent, or Firm*—Renner, Kenner, Greive, Bobak & Taylor

[57] ABSTRACT

An airfoil having improved aerodynamic characteristics incorporates a leading edge (13) and a trailing edge (14) longitudinally displaced therefrom. A continuous lower surface (21), defining the lower camber of the airfoil, extends from the leading edge (13) to the trailing edge (14). The upper surface of the airfoil incorporates a first upper surface (22) extending rearwardly from the leading edge (13) and terminating in an offset (20), and at least a second upper surface (23) extending rearwardly therefrom. The first upper surface (22) defines a first upper camber portion of the airfoil and the second upper surface (23) defines a second upper camber portion thereof.

25 Claims, 16 Drawing Figures

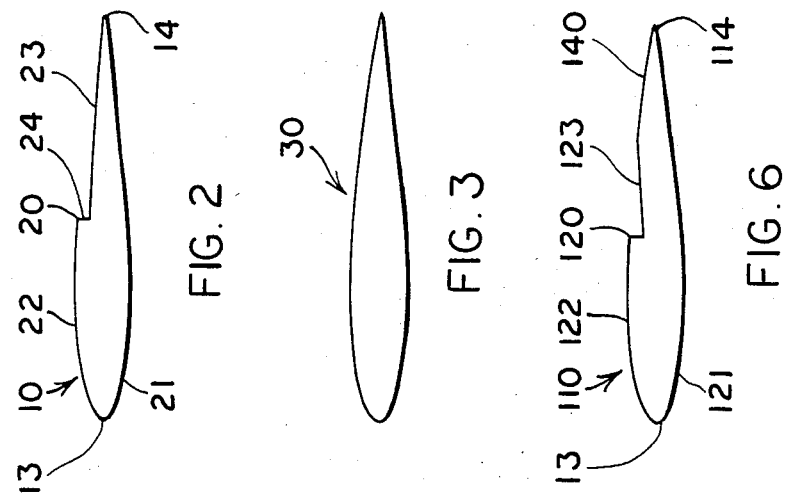
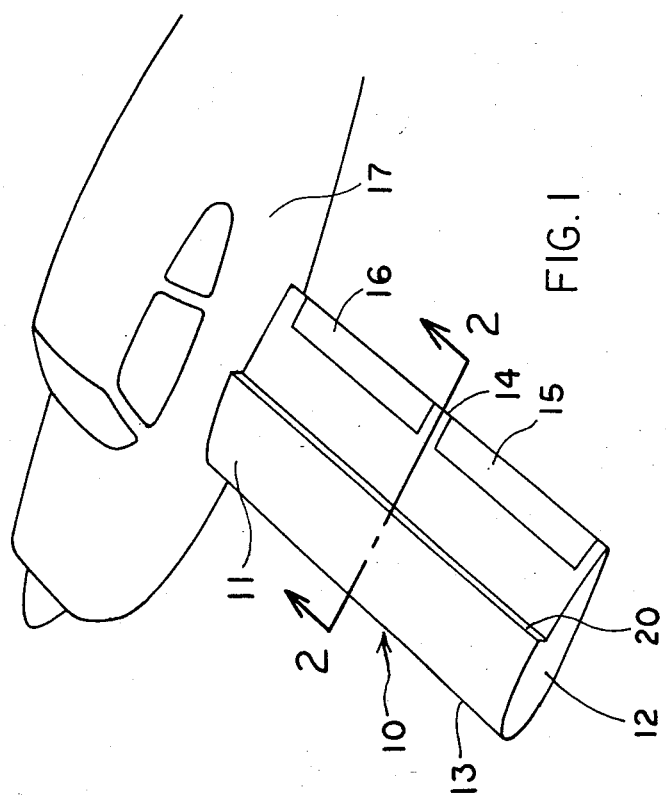

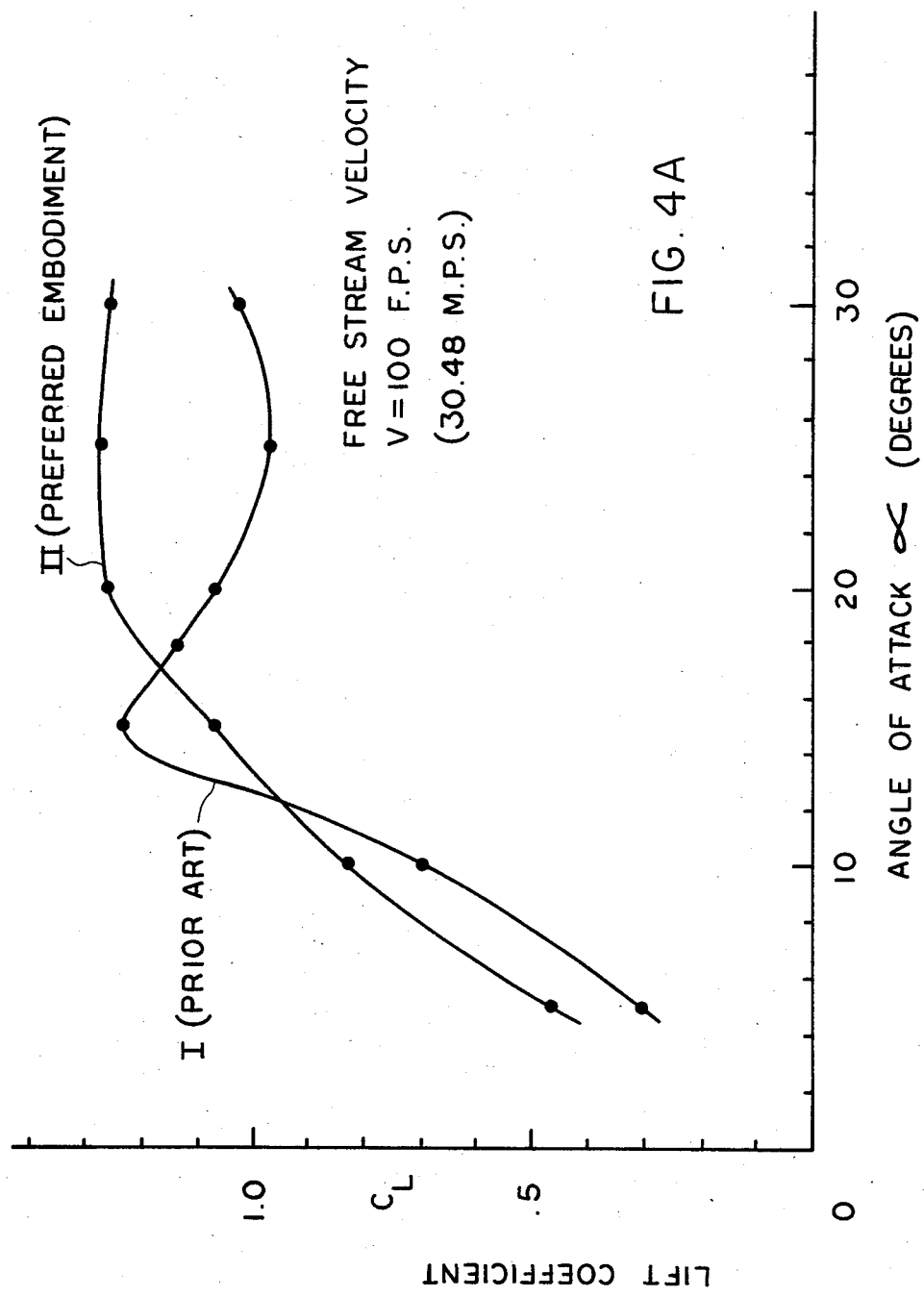

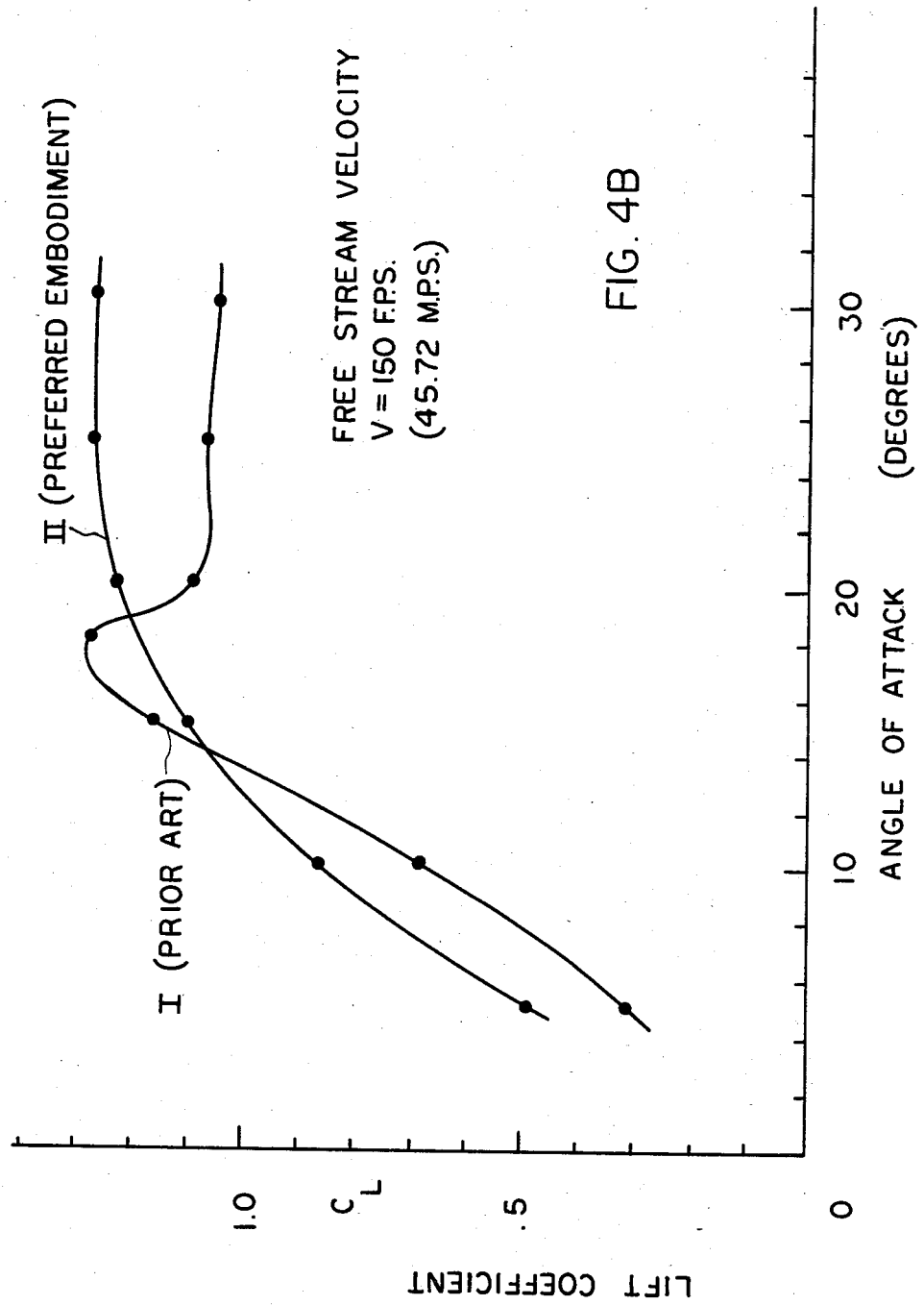

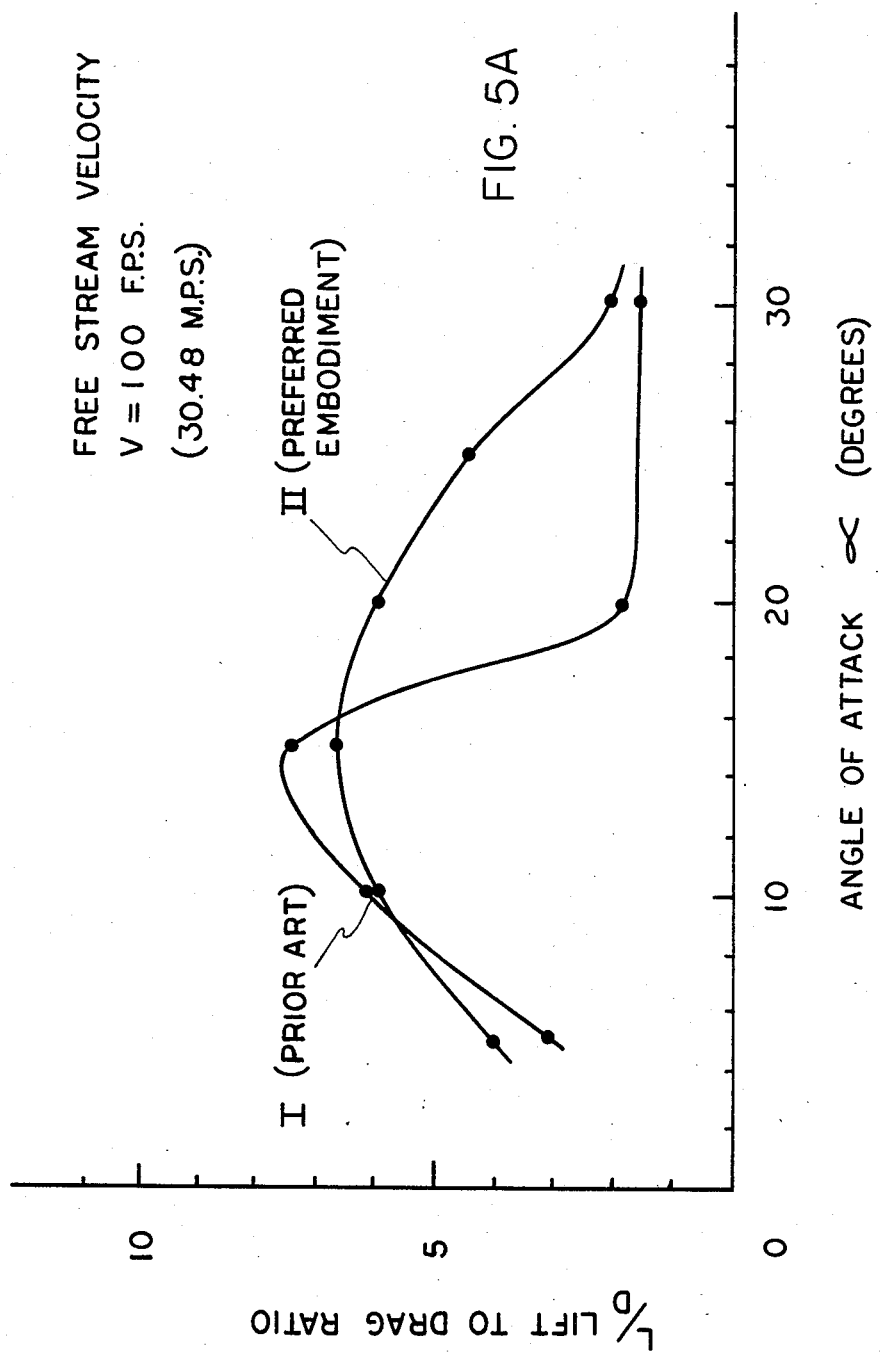

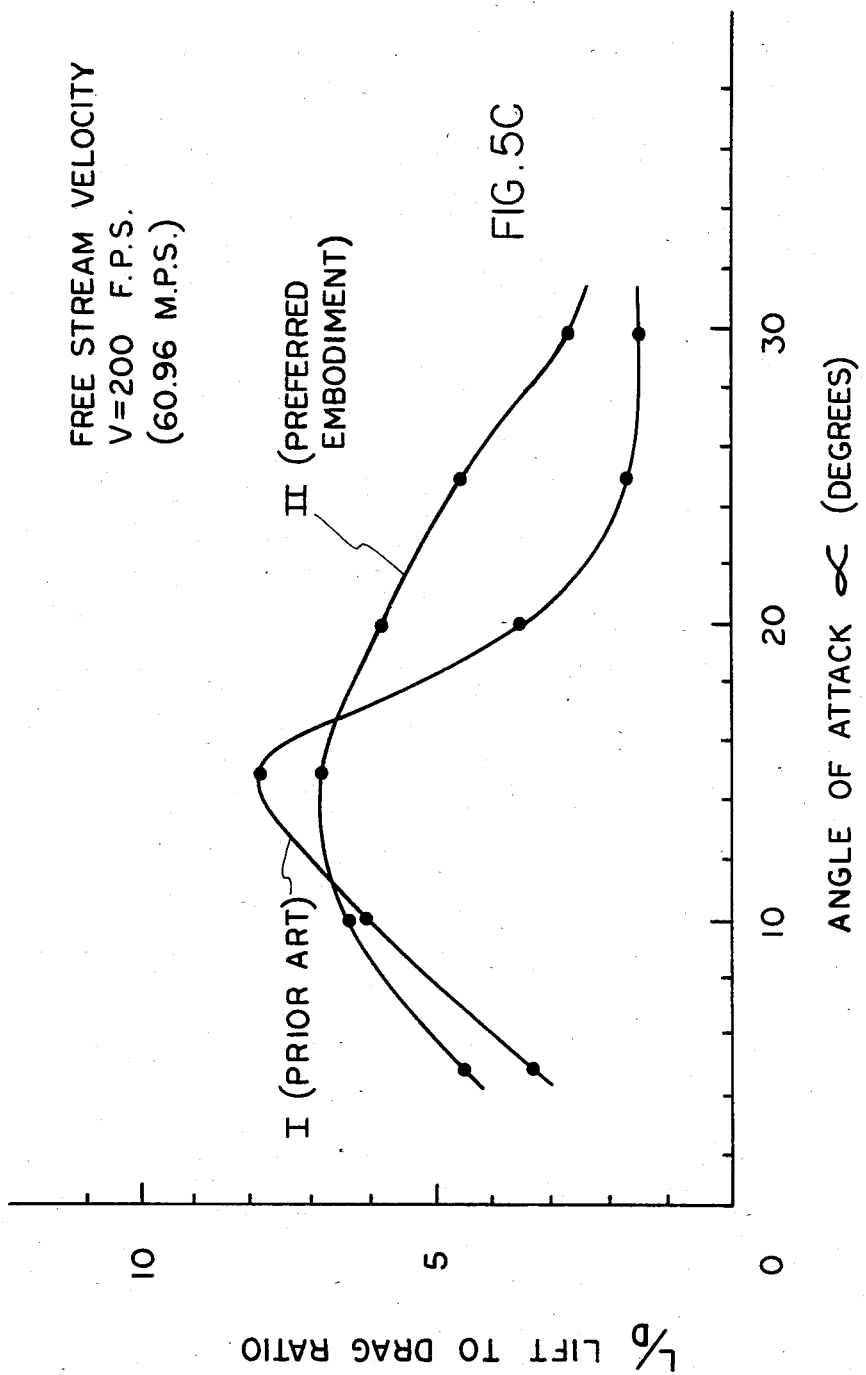

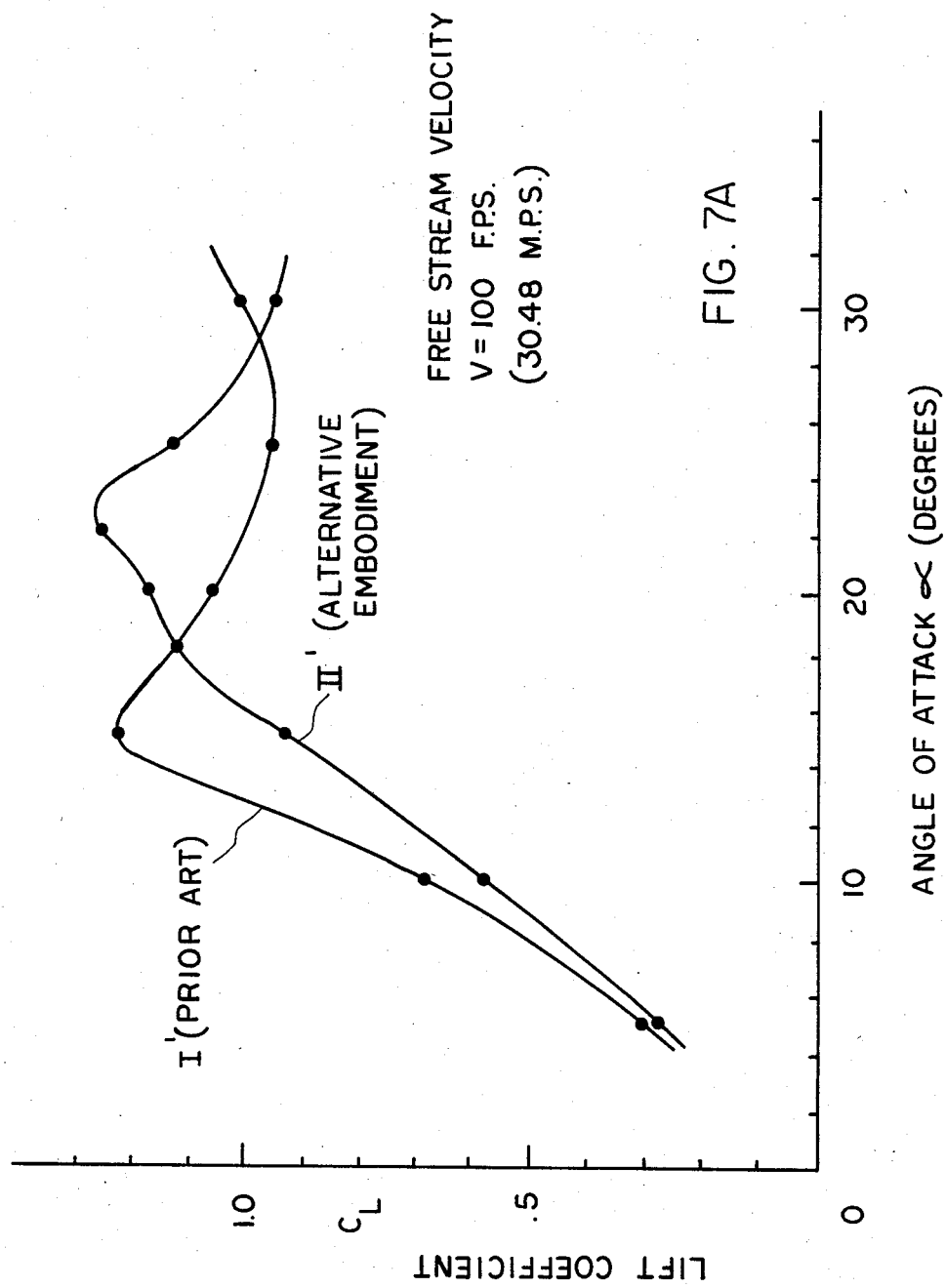

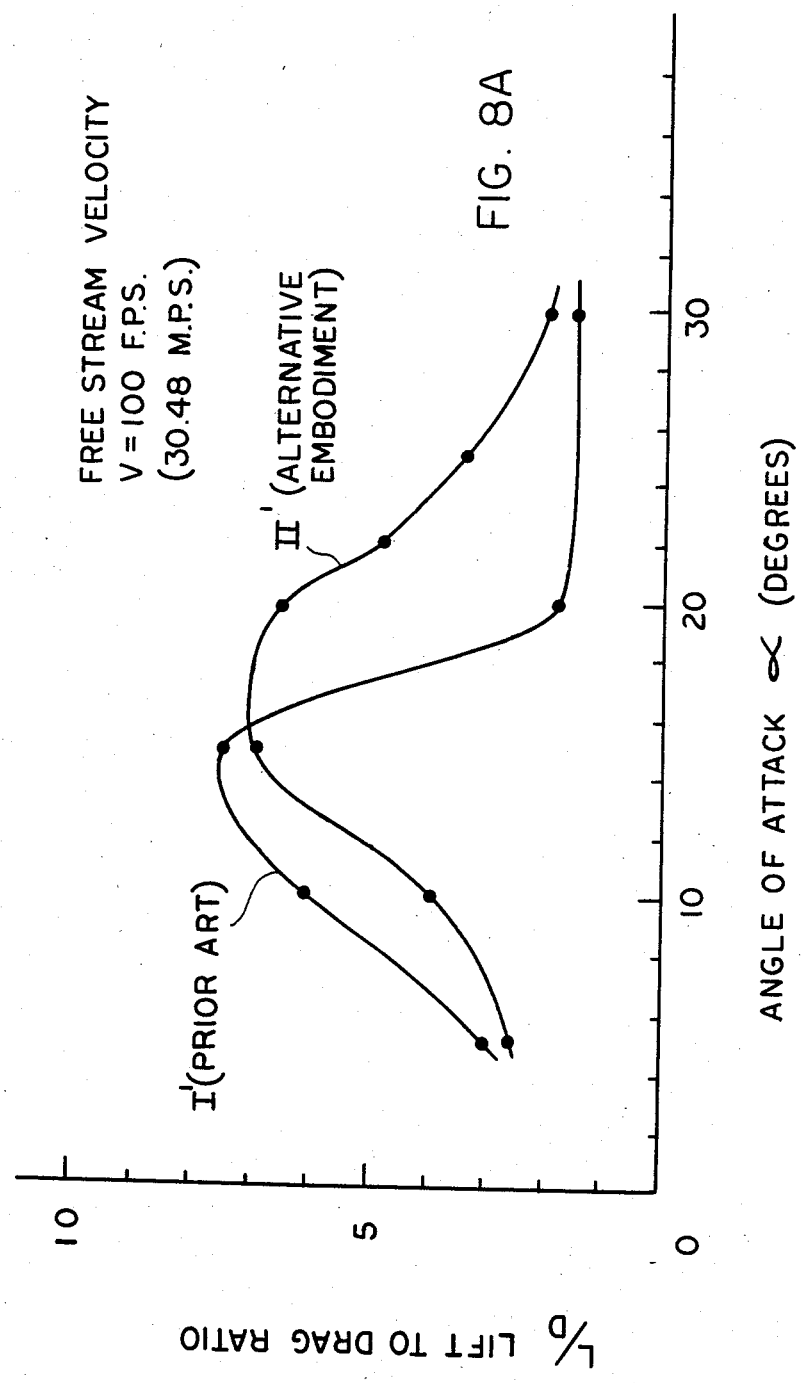

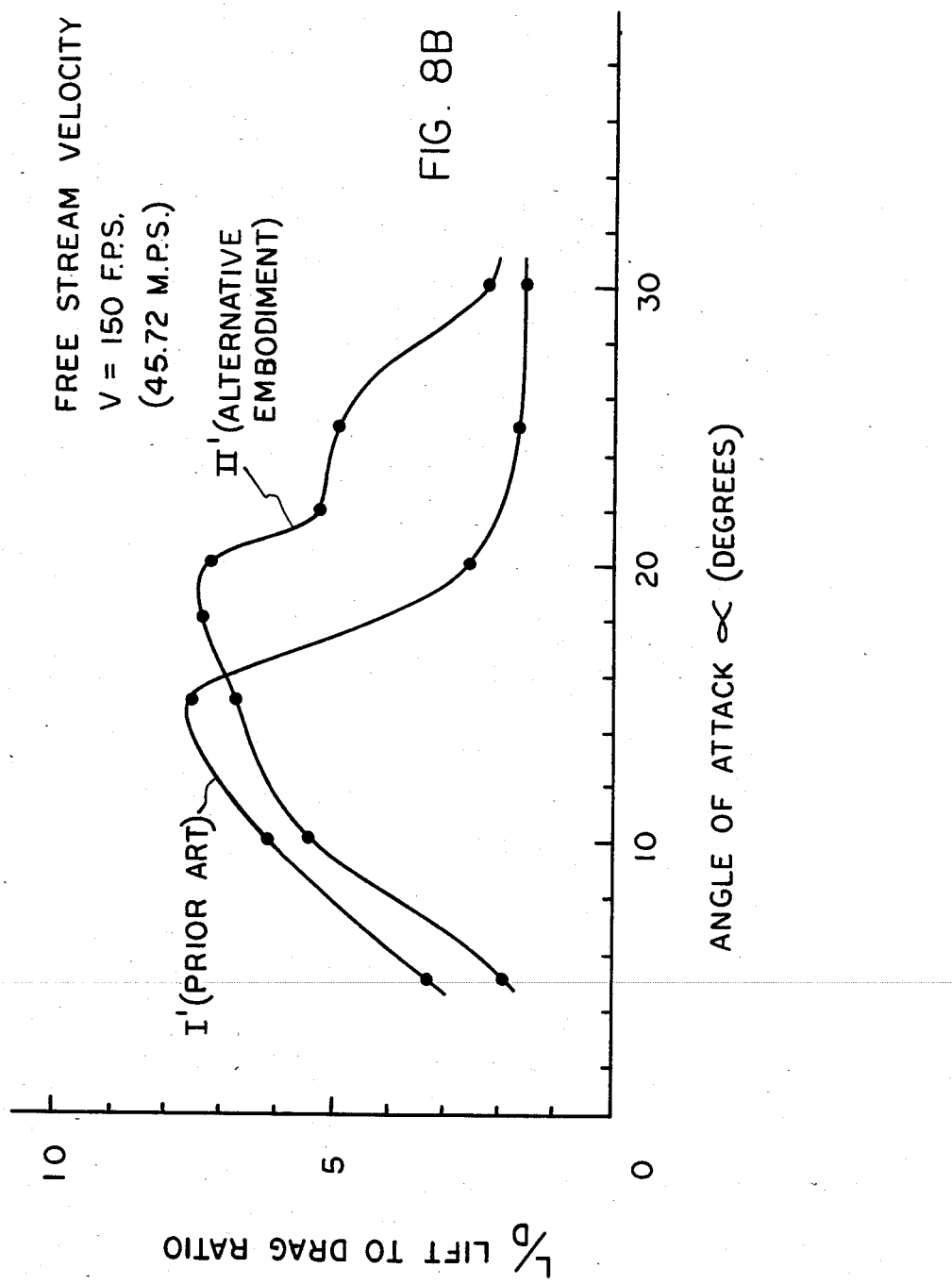

AIRFOIL

TECHNICAL FIELD

The present invention relates generally to an airfoil having improved aerodynamic characteristics. Particularly the present invention relates to an airfoil having improved lift coefficients at operational angles of attack. More particularly, the present invention relates to an airfoil having improved lift to drag ratios at operational angles of attack. Furthermore, the present invention relates to an airfoil capable of operating at greater angles of attack without experiencing stalling conditions.

BACKGROUND ART

The aerodynamic principles of airfoils have been the subject of continuing study since the mid-1800's. Scientists, engineers and experimentalists have continually sought to understand and improve on the aerodynamic characteristics of the airfoil. Much of this development has been spurred by the growing interest in flying and the desire to build a safer aircraft.

The primary concern with any airfoil design is twofold: first, to produce a greater amount of lift without detrimentally increasing drag and, second, to enable the airfoil to function at greater angles of attack without stalling. Coupling these desired parameters with the wide range of airspeeds to which the airfoil may be exposed results in a multitude of airfoil designs, each with its own aerodynamic characteristics to perform optimally at a specific flight condition. With respect to the wing of an airplane, for example, a design suitable for producing substantial lift at low airspeeds inherently produces excessive drag at high airspeeds. On the other hand, a wing designed to fly with minimal drag at high airspeeds generally fails to produce sufficient lift at low airspeeds to maintain flight, as during takeoffs and landings. This latter condition results in a stalling of the wing as the angle of attack of the wing is increased, in an effort to produce greater lift, until the critical angle of attack is exceeded. It is recognized, of course, that an airfoil will stall at any airspeed whenever the angle of attack of the airfoil to the free stream airflow exceeds the critical angle of attack for the particular airfoil.

In an effort to improve the overall aerodynamic characteristics of the airplane wing throughout a wide variety of flight conditions, designers have turned to movable slots and/or flaps on the leading and trailing edges of the wing which change the cross-sectional profile of the wing. These slots and/or flaps may be adjusted during flight for optimum performance of the wing at various flight conditions. For example, at high airspeeds, the slots and/or flaps are fully retracted to give the wing a relatively thin, streamlined profile thereby reducing the drag acting thereon. At lower airspeeds, however, the slots and/or flaps are extended downward to produce a greater camber on the wing which permits the wing to develop greater lift, albeit with greater drag. Such use of slots and/or flaps, therefore, increase the aircraft's operational angles of attack, i.e., the angles of attack through which the aircraft can safely operate. However, because of the increase in drag, the extension of slots and/or flaps is only advisable at relatively low airspeeds and, thus, they are unable to improve the lift and stall characteristics of the wing at high, cruising airspeeds.

Efforts have been made to design an airfoil having improved stall characteristics at high airspeeds. One of the most interesting designs is an airfoil having a substantially wedge-shaped profile with a step-like discontinuity on the under surface thereof. While this design exhibits improved stall characteristics, tests have shown that such is accomplished at the expense of lift and with substantial reductions in the lift to drag ratio of the airfoil.

Despite the extensive work conducted in this field, no airfoil, as yet, has been developed which provides improved stall characteristics at virtually all operational airspeeds while simultaneously providing improved lift and lift to drag ratios.

DISCLOSURE OF THE INVENTION

It is, therefore, a primary object of the present invention to provide an airfoil having improved stall characteristics at virtually all operational airspeeds.

It is another object of the present invention to provide an airfoil having functional lift coefficients over a broader range of operational angles of attack.

It is a further object of the present invention to provide an airfoil having functional lift to drag ratios over a broad range of operational angles of attack.

It is yet another object of the present invention to provide an airfoil suitable for use with aircraft of the fixed-wing type and, also, of the rotary wing type.

These and other objects of the invention, as well as the advantages thereof over existing and prior art forms, which will be apparent in view of the following specification, are accomplished by means hereinafter described and claimed.

In general, an airfoil according to the concept of the present invention includes a leading edge and a trailing edge located longitudinally rearward thereof. A continuous lower surface extends from the leading edge to the trailing edge and defines a lower camber. A first upper surface extends rearwardly from the leading edge and terminates in an offset, forwardly of the trailing edge. The first upper surface defines a first upper chamber portion. At least a second upper surface extends rearwardly from the offset and defines a second upper camber portion.

One preferred, and one alternative, embodiment of an airfoil incorporating the concept of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a partial perspective view of an airfoil embodying the concept of the present invention, shown in relation to the fuselage of a fixed-wing aircraft;

FIG. 2 is a cross-section of the airfoil taken along line 2—2 of FIG. 1;

FIG. 3 is a cross-section of an airfoil embodying the prior art;

FIGS. 4A through 4C, inclusive, are lift coefficient curves of the airfoil of FIG. 1 depicted in comparison to corresponding curves for the prior art airfoil of FIG. 3 taken at various free stream velocities;

FIGS. 5A through 5C, inclusive, are lift to drag ratio curves of the airfoil of FIG. 1 depicted in comparison to corresponding curves for the prior art airfoil of FIG. 3 taken at various free stream velocities;

FIG. 6, located on sheet 1, is a cross-section of an alternative embodiment for an airfoil embodying the concept of the present invention;

FIGS. 7A through 7C, inclusive, are lift coefficient curves of the airfoil of FIG. 6 depicted in comparison to corresponding curves for the prior art airfoil of FIG. 3, taken at various free stream velocities; and FIGS. 8A through 8C, inclusive, are lift to drag ratio curves of the airfoil of FIG. 6 depicted in comparison to corresponding curves for the prior art airfoil of FIG. 3, taken at various free stream velocities.

EXEMPLARY EMBODIMENT OF THE INVENTION

Figure 4C:
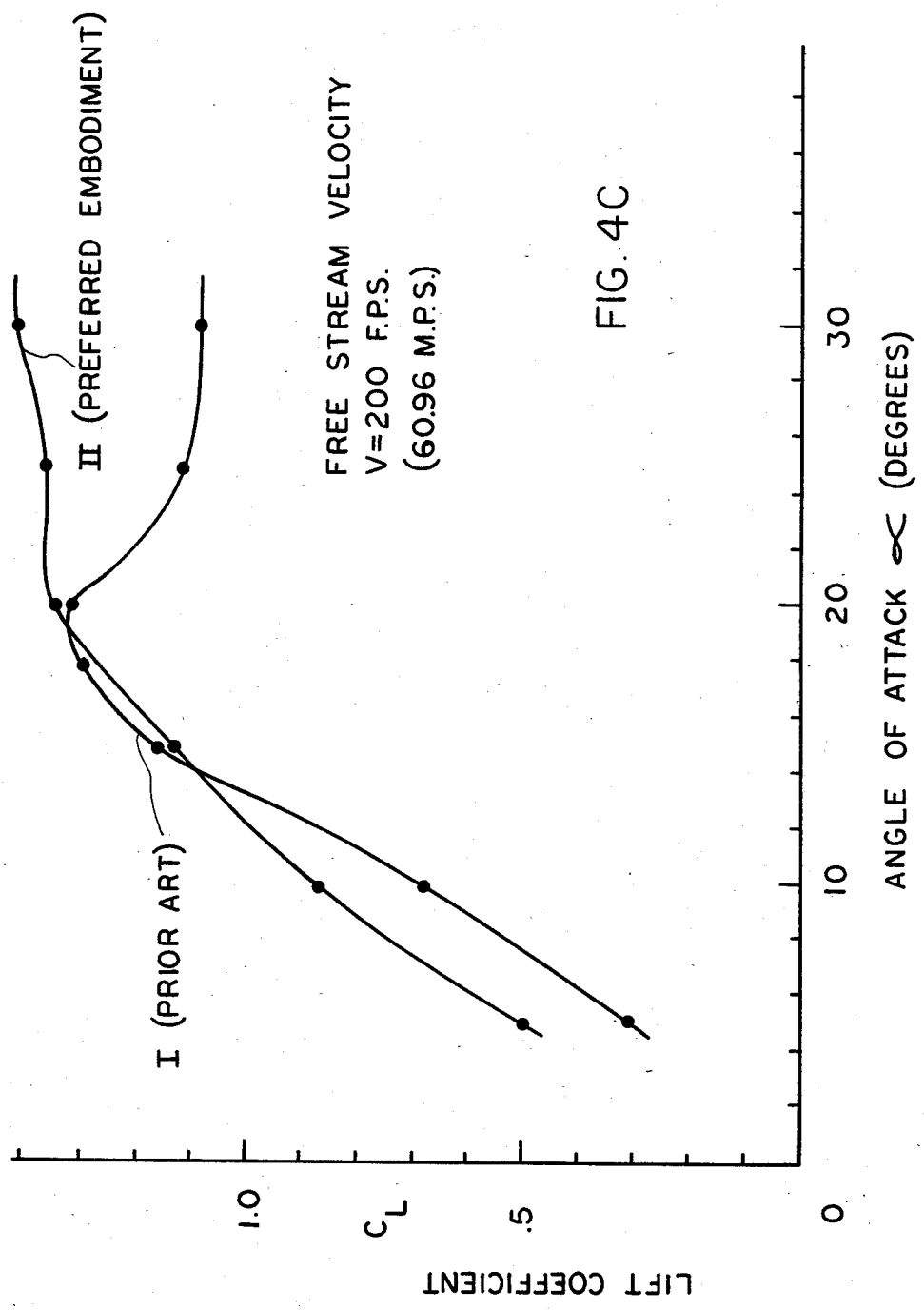

An airfoil according to the concept of the present invention is indicated generally by the numeral 10 in FIG. 1, particularly as a wing member of a fixed-wing aircraft. As a wing member, the airfoil generally includes a root section 11, by which it is secured to the fuselage 17 of the aircraft, and a wing tip 12 laterally distal of the root section 11. A leading edge 13 and a longitudinally displaced trailing edge 14 extend between the root section 11 and the wing tip 12, and, together therewith, define the planform of the airfoil 10. Control surfaces, such as an aileron 15 and flap 16 may, likewise, be incorporated in the airfoil 10.

A laterally extending offset 20 is carried by the upper surface of the airfoil 10. While the offset 20 is shown as extending fully from the root section 11 to the tip 12, it should be appreciated that such is not a requirement. The fundamental principle of the subject invention should be understood to include a lateral offset extending over an appreciable amount of the upper surface of the airfoil 10. For example, several segmented lateral offsets may be positioned laterally along the upper surface of airfoil 10. Furthermore, particularly on high-wing aircraft, the lateral offset may extend continuously across the top of the fuselage region. Likewise, although offset 20 is shown to be positioned longitudinally proximate the mid-point of the chord length of the airfoil 10, this is but an exemplary position as will be discussed more fully below.

The profile of airfoil 10 with offset 20 is shown in more detail in FIG. 2. Specifically, airfoil 10 includes a lower surface 21 extending from leading edge 13 to trailing edge 14. While it is preferred that lower surface 21 defines a negative camber, as shown, other configurations, including a flat planar surface and a positive camber surface, are likewise contemplated.

The upper surface, in toto, of airfoil 10 is defined by a first upper surface 22 which extends from leading edge 13 rearwardly to offset 20; and, a second upper surface 23 continuing rearwardly from offset 20 to trailing edge 14. The rearward end of first upper surface 22 is elevationally displaced from the forward end of second upper surface 23 as a result of offset 20.

First upper surface 22 generally defines a positive camber as normally found on existing airfoils. As is appreciated by one skilled in the art of aerodynamics, when the free stream flow encounters an airfoil, part of the flow passes above the airfoil along the upper surface while part of the flow passes below the airfoil along the lower surface. The two flow paths act upon the airfoil to generate the desired lift. Particularly, the flow above the airfoil moves at a higher velocity than the flow below the airfoil due to the positive camber of the upper surface; and, as such, causes an area of pressure to exist along the upper surface which is less than the area of pressure along the lower surface.

The difference in pressure is the principle behind the generation of lift by the airfoil. The magnitude of the lift, therefore, is dependent upon the velocity of the free stream, relative to the airfoil, and the amount of positive camber of the upper surface of the airfoil, as well as other related factors such as the free stream flow striking the lower surface of the airfoil. As such, while the amount of positive camber of first upper surface 22 may be relatively small for an airfoil suitable for operating at high velocity free streams, a positive camber, nonetheless, is preferred.

The second upper surface 23, on the other hand, may define other than a positive camber. Indeed, FIG. 2 shows second upper surface 23 as being a substantially continuous planar, rearwardly inclined surface substantially impermeable to airflow. Other configurations, such as a negative camber or a forwardly inclined surface, are likewise contemplated within this disclosure to effect desired flight characteristics by the airfoil 10 in specific free stream conditions. The common factor in each configuration is that second upper surface 23 is a substantially continuous, impermeable member.

Offset 20 is shown in FIG. 2 as being a substantially continuous impermeable vertical surface 24 which, with first upper surface 22, defines an abrupt aerodynamic structural change on the upper surface of airfoil 10. As would be appreciated by one skilled in fluid mechanics, such an abrupt aerodynamic structural change is achieved as a result of the pronounced elevational difference between first upper surface 22 and second upper surface 23. This being the case, the configuration of offset 20 can vary considerably yet accomplish the desired result, i.e., define an abrupt aerodynamic structural change in the upper surface of the airfoil 10.

The advantages of the disclosed airfoil 10 may be more fully appreciated by considering performance curves thereof. In particular, comparison is made between the disclosed airfoil 10 and a pre-existing airfoil 30, as shown in FIG. 3.

The exemplary pre-existing airfoil 30 has been classified by the National Advisory Committee for Aeronautics (NACA), the predecessor to the National Aeronautical and Space Administration (NASA), as series 23012. So as to provide a true comparison, the disclosed airfoil 10 tested was dimensionally equivalent thereto. The offset 20 was located at 50 percent of the chord length, with an elevational difference of 25 percent of the thickness of the airfoil 10 at that location. Second upper surface 23 was substantially planar and extended to trailing edge 14.

FIGS. 4A, 4B and 4C compare the lift coefficient ($C_L$) at various angles of attack ($\alpha$) at free stream velocities of 100 feet per second (f.p.s.) (31 meters per second (m.p.s.)), 150 f.p.s. (46 m.p.s.) and 200 f.p.s. (61 m.p.s.), respectively. In each case, the NACA 23012 airfoil 30 achieved a maximum lift coefficient between approximately 14° to 19° angle of attack, as shown by curve I. Moreover, a sudden substantial loss of lift was experienced after achieving maximum lift. This sudden loss of lift indicated that the NACA 23012 airfoil 30 was stalling.

The disclosed airfoil 10 attained equivalent or greater maximum lift coefficients and was able to do so at larger angles of attack, approximately 25° to 30°, as shown by curve II in FIGS. 4A, 4B and 4C. Furthermore, upon attaining maximum lift, airfoil 10 did not experience stall but rather continued generating substantial lift at even greater angles of attack, and only gradually reduced lift as the angle of attack increased. In addition, at lower, operational angles of attack, less than 12°, airfoil 10 generated substantially greater lift than did NACA 23012 airfoil 30.

Figure 5B:
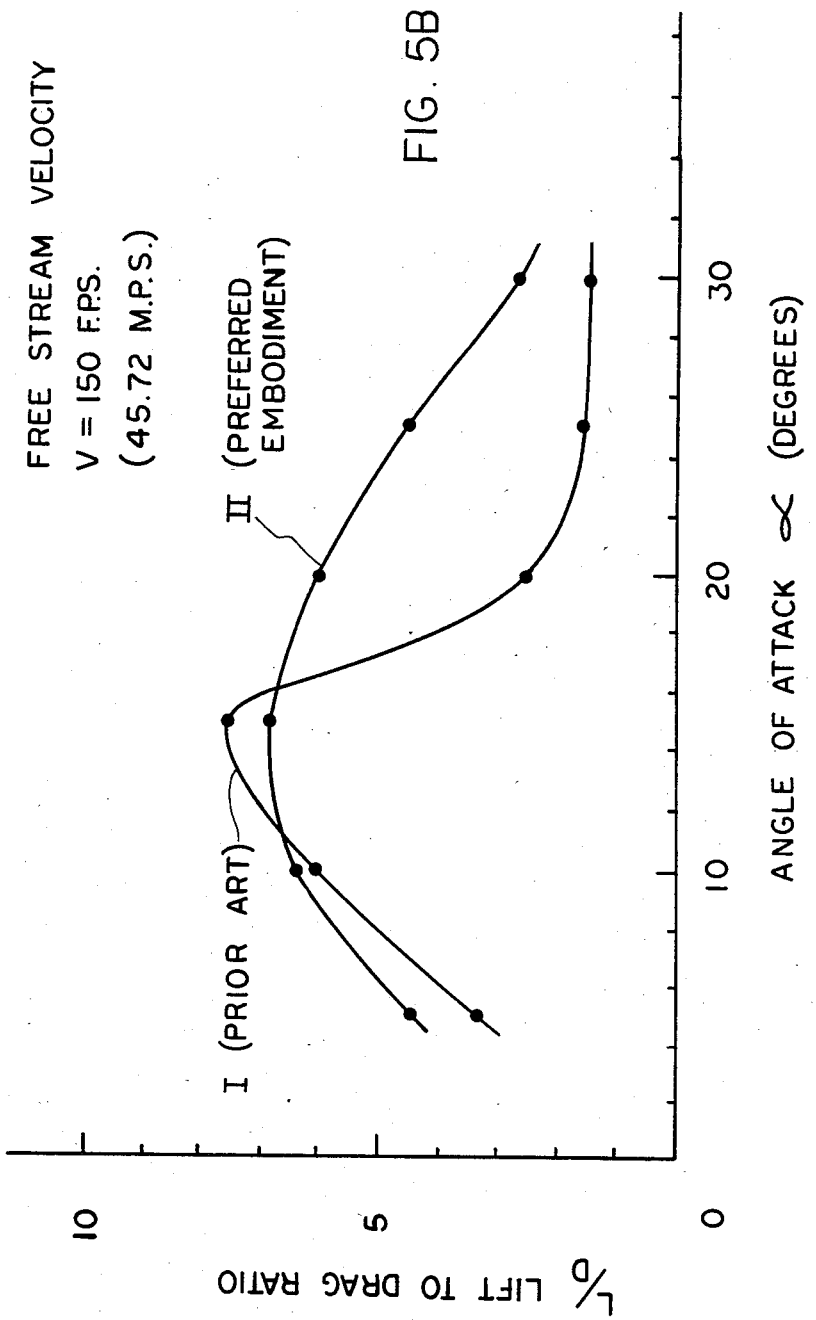

FIGS. 5A, 5B and 5C show a comparison of the lift to drag ratios (L/D) for various angles of attack at airspeeds of 100 f.p.s. (31 m.p.s.), 150 f.p.s. (46 m.p.s.) and 200 f.p.s. (61 m.p.s.), respectively. Again, curve I indicates the performance of NACA 23012 airfoil 30 and curve II indicates the performance of disclosed airfoil 10. It should be recognized that at operational angles of attack less than approximately 12° the lift to drag ratio of the disclosed airfoil 10 exceeded that of NACA 23012 airfoil 30. And, while NACA 23012 airfoil 30 experienced a greater maximum lift to drag ratio this occurred effectively at the critical angle of attack immediately preceding the stall. In all practicality, such maximum lift to drag ratios for NACA 23012 airfoil 30 will not be utilized because of the inevitable stalling. As such, for operational angles of attack, less than 12°, the lift to drag ratios of the disclosed airfoil 10 are superior to those of the comparable NACA 23012 airfoil 30. In addition, airfoil 10 produced acceptable lift to drag ratios well beyond the point where NACA 23012 airfoil 30 stalled, thereby indicating that airfoil 10 was still functioning.

It should be evident from the foregoing that an airfoil of the preferred embodiment possesses unexpectedly improved aerodynamic characteristics as compared to a similar, pre-existing airfoil. Particularly, the disclosed airfoil 10 generates greater lift with improved lift to drag ratios. Furthermore, the disclosed airfoil 10 is capable of operating at greater angles of attack without experiencing stall conditions.

Improved aerodynamic characteristics are likewise associated with the alternative embodiment airfoil 110, depicted in FIG. 6. The only significant difference between airfoil 10 and airfoil 110 is represented by the second upper surface 123. Rather than extending rearwardly to trailing edge 114, as in the case of airfoil 10, second upper surface 123 breaches the upper surface of airfoil 110 forwardly of trailing edge 114. A third upper surface 140 continues rearwardly of second upper surface 123 to trailing edge 114. Third upper surface 140 may represent a continuation of the first upper surface 122 as would exist if a prior art airfoil 30 is modified to embody the present invention.

While it is preferred that third upper surface 140 define a camber equivalent to the camber of prior art airfoil 30 in the same region, such is not a necessity and a variety of planar or cambered surfaces may be suitable. It is desired, however, that the thickness of airfoil 110 between third upper surface 140 and lower surface 121 be greater than that of airfoil 10 in the same region. Such increased thickness provides greater interior space within airfoil 110 for locating and routing control devices and linkages for operating control surfaces such as flaps and ailerons. Such thickness, of course, will depend on the structural integrity of the airfoil as well as the design of the control devices.

It should be appreciated that the aerodynamic characteristics of airfoil 110 are improved over preexisting airfoils as a result of offset 120, similar to the effect of offset 20 in airfoil 10. Primarily, offset 120 constitutes an aerodynamic discontinuity in the upper surface of airfoil 110 in the same manner as offset 20 in airfoil 10. Thus, because of these similarities, the discussion, hereinabove, pertaining to the physical structure of offset 20 are likewise pertinent to the physical structure of offset 120.

The improved aerodynamic characteristics of airfoil 110 may be more fully appreciated by, again, considering performance data thereof in comparison with a dimensionally equivalent pre-existing airfoil. Again, NACA 23012 airfoil 30 was chosen as the airfoil configuration for such comparative testing. Offset 120 in airfoil 110 was located at 50 percent of the chord length, with an elevational difference of 33 percent of the thickness of the airfoil 110 at that location. Second upper surface 123 was substantially planar and breached the upper surface of airfoil 110 at approximately 70 percent of the chord length rearwardly from the leading edge 113. Third upper surface 140 had a profile equivalent to NACA 23012 airfoil 30 through the same region.

Figure 7B:
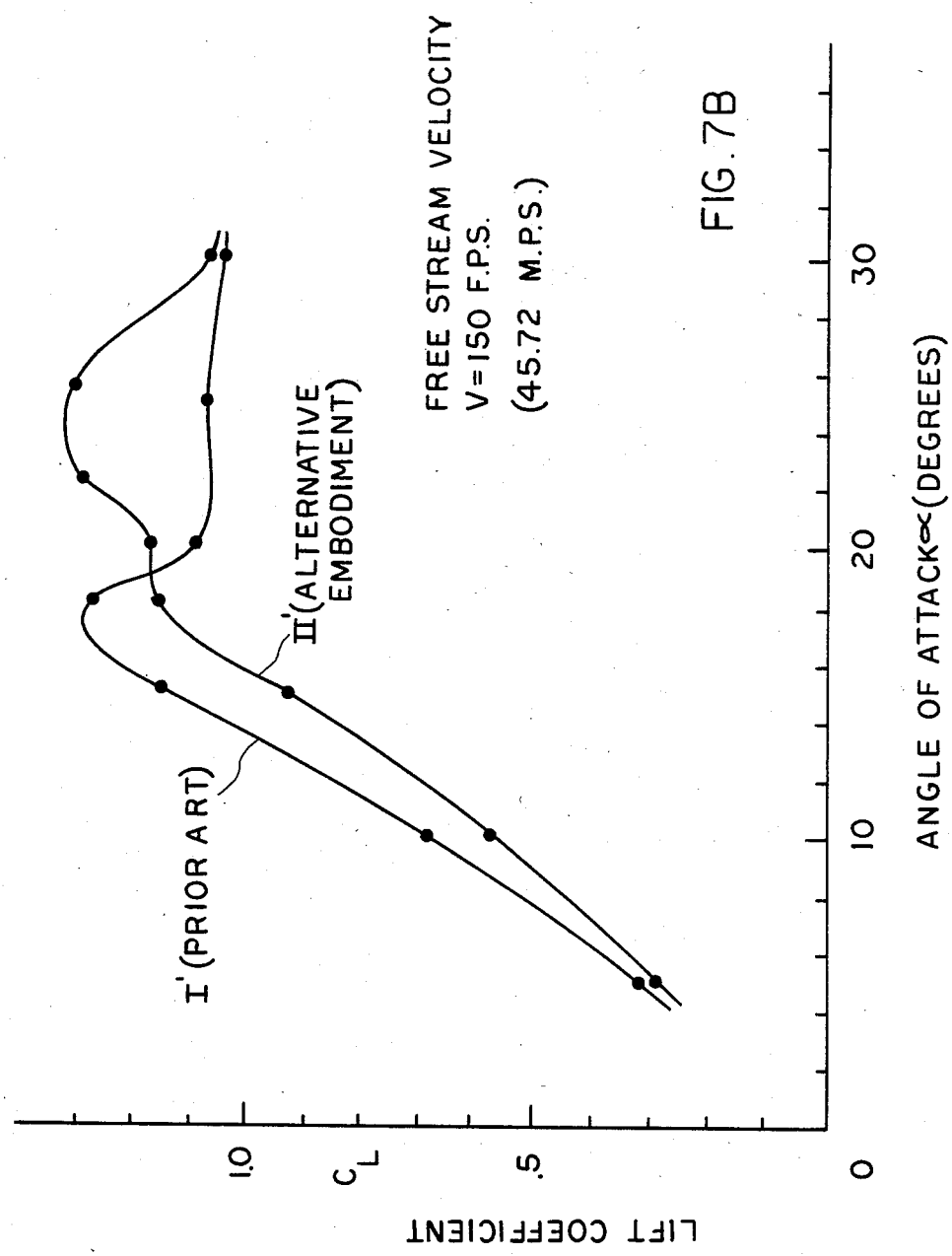
Figure 7C:
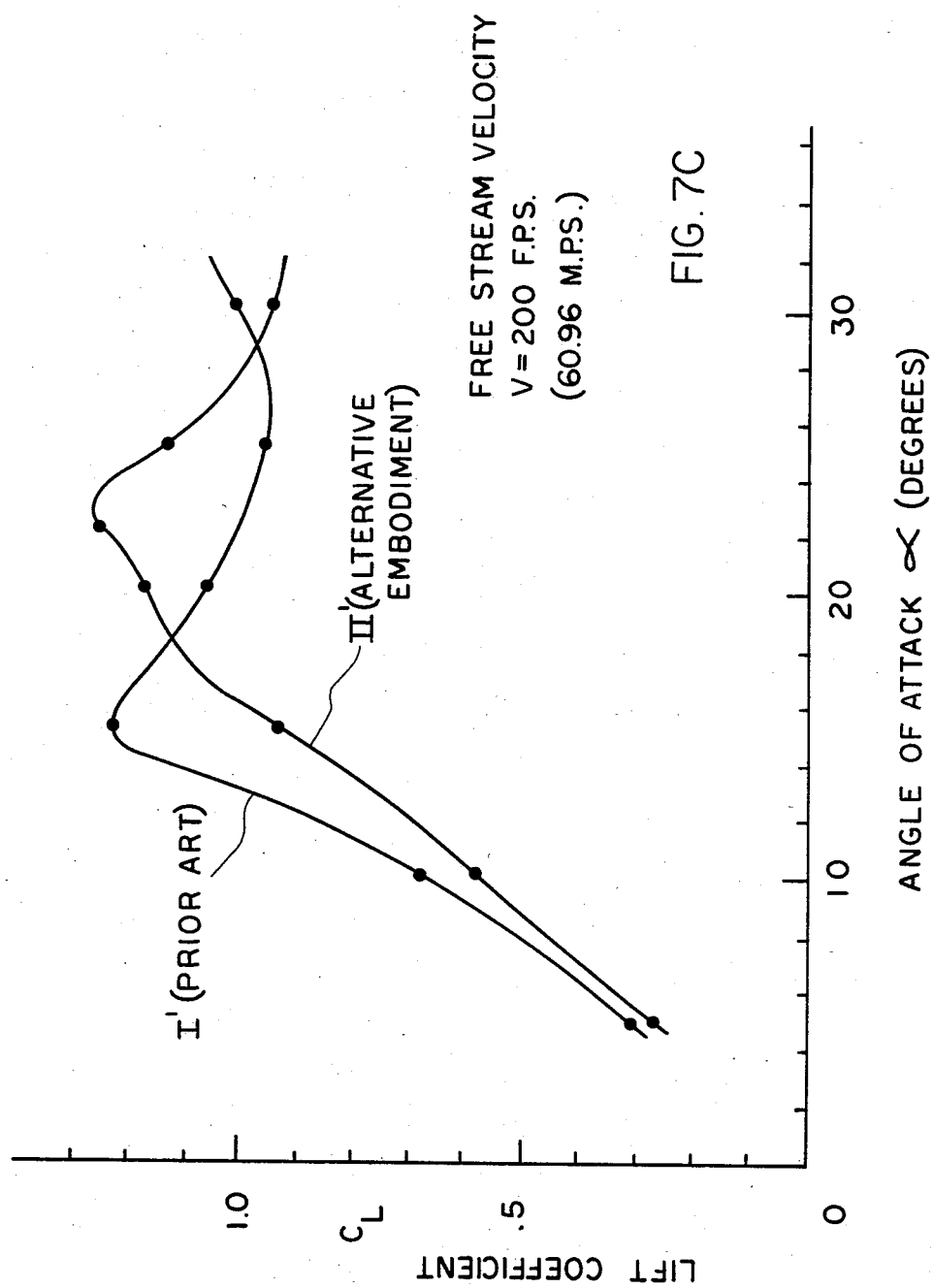

FIGS. 7A, 7B and 7C compare the lift coefficient ($C_L$) at various angles of attack ($\alpha$) at free stream velocities of 100 f.p.s. (31 m.p.s.), 150 f.p.s. (46 m.p.s.) and 200 f.p.s. (61 m.p.s.), respectively. The performance of NACA 23012 airfoil 30 is represented by curve I', and that of airfoil 110 by curve II'.

It should be recognized that airfoil 110 consistently was able to perform at greater angles of attack than NACA 23012 airfoil 30. However, it should also be recognized that airfoil 110 does stall, at least at free stream velocities of 100 f.p.s. (31 m.p.s.) and 150 f.p.s. (46 m.p.s.), FIGS. 7A and 7B, respectively, as indicated by the sudden drop in the lift coefficient subsequent to attaining a maximum value. Also, a slight loss of lift for airfoil 110 was experienced at lower, operational angles of attack.

Figure 8C:
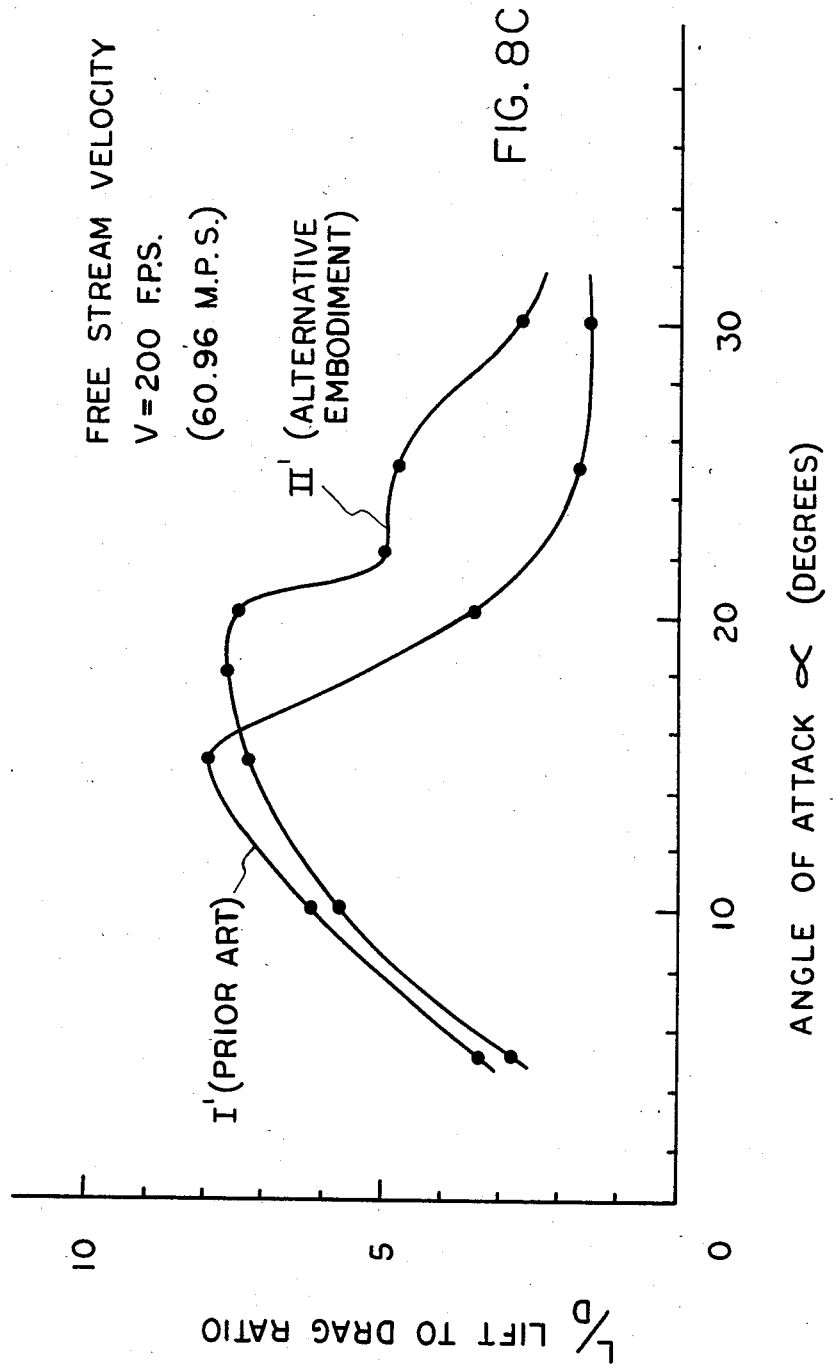

FIGS. 8A, 8B and 8C show a comparison of the lift to drag ratios (L/D) for various angles of attack ($\alpha$) at airspeeds of 100 f.p.s. (31 m.p.s.), 150 f.p.s. (46 m.p.s.) and 200 f.p.s. (61 m.p.s.), respectively. Again, curve I' represents the performance of NACA 23012 airfoil 30 and curve II' represents the performance of airfoil 110. It should be recognized that although a lower lift to drag ratio is attributable to airfoil 110 at lower, operational angles of attack, this being a result of the lower lift coefficients at these angles, airfoil 110 continued to provide usable flight characteristics well beyond the stall angle of NACA 23012 airfoil 30. In short, airfoil 110 continued to fly at angles of attack well after NACA 23012 airfoil 30 had stopped flying and stalled.

An overview of the foregoing performance characteristics of airfoil 110 demonstrates its inferiority to airfoil 10, though an improvement in many respects over NACA 23012 airfoil 30. Such performance of airfoil 110 may be attributable to the fact that its cross-sectional configuration is more similar to that of NACA 23012 airfoil 30 and, as such, would be more susceptible to the inherent problems thereof, i.e., stalling and reduced lift. Furthermore, airfoil 10 may, indeed, be approaching an optimum configuration of an airfoil embodying the concept of the present invention and, as such, should exhibit superior performance curves.

These tests results indicate exemplary embodiments of the disclosed airfoil and, the performance characteristics attributable thereto. They are not, however, limiting factors in the instant disclosure. Indeed, it has been determined that unexpectedly improved aerodynamic performance is attainable when the offset is located within a range of 40 to 60 percent of the chord length from the leading edge of the airfoil, and with an elevational difference within the range of 10 to 60 percent of the thickness of the airfoil at the location of the offset. Therefore, the appreciable improvement in aerodynamic performance of an airfoil embodying the concept of the present invention is expected for a wide variety of offset locations and configurations.

It should further be noted that the location, size and configuration of the offset may find limiting parameters solely in the structural integrity of the airfoil. That is, sufficient body of the airfoil will be required so as to maintain the necessary mechanical strength thereof, irrespective of the offset. In this regard, a plurality of distinct offsets may be disposed laterally along the airfoil or the internal rib structure of the airfoil may not carry the offset but rather protrude into the offset and section it into aerodynamically distinct segments. Likewise, it may be desirable to employ a plurality of longitudinally displaced offset along the upper surface of the airfoil. Furthermore, the depth of the offset may vary along the span of the airfoil, such as being tapered from root to tip thereof. These modifications, of course, while contributing to the structural integrity of the airfoil, also are contributing factors in the aerodynamic performance thereof. Indeed, the boundary layer characteristics of the flow stream at any point along the airfoil will govern the configuration and location of the offset at that particular point.

The foregoing discussion demonstrates that, contrary to expectations developed by the prior art and theory of aerodynamics, an aerodynamic discontinuity generated by an offset in the upper surface of an airfoil results in substantial improvements in the aerodynamic characteristics thereof. Such improvements are directly attributable to the offset, itself, and the effect it has on the flow stream about the airfoil. As such, it would be conjectured that the exact location and configuration of the offset may be varied along the upper surface of the airfoil while still favorably affecting the aerodynamic characteristics of the airfoil. It would be expected, however, that for a specific flow condition and boundary layer characteristics, a specific range of locations and configurations for the offset will produce optimum performance of the airfoil. Furthermore, while the foregoing discussion has been directed primarily to an airfoil, such is but an exemplary model of the disclosure. It should be understood that other lifting bodies such as, for example, hydrofoils, sails, and vanes, are likewise contemplated within the scope of the invention as disclosed. In addition, the disclosed airfoil would also prove advantageous in use on rotor blades of rotary-wing aircrafts and propellers of fixed-wing aircrafts as well as on a winglet in conjunction with, or independent of, other airfoils on the aircraft. In short, virtually any body which interacts with a free stream flow will experience improvements in its performance characteristics upon incorporation of the disclosed invention therein.

Thus it should be evident that an airfoil embodying the concept of the invention disclosed herein carries out the various objects of the invention and otherwise constitutes an advantageous contribution to the art.

We claim:

1. A lifting body comprising:
   a leading edge;
   a trailing edge located longitudinally rearward of said leading edge;
   a continuous lower surface extending from leading edge of said trailing edge, said lower surface defining a lower camber;
   a first upper surface extending rearwardly from said leading edge and terminating in at least one offset forwardly of said trailing edge, said first upper surface defining a positive upper camber portion; and
   at least a second upper surface extending rearwardly from a said offset, said second upper surface defining a negative upper camber portion.

2. A lifting body according to claim 1, in which said second upper surface has a forward end elevationally displaced from said first upper surface.

3. A lifting body according to claim 2, in which said offset is a substantially vertical surface extending from said first upper surface to said second upper surface.

4. A lifting body according to claim 1, in which said second upper surface extends rearwardly to said trailing edge.

5. A lifting body according to claim 1, further comprising:
   a third upper surface extending rearwardly from said second upper surface to said trailing edge, said third upper surface defining a third camber portion.

6. A lifting body according to claim 5, in which said third upper surface defines a positive camber.

7. An airfoil comprising:
   a leading edge;
   a trailing edge located longitudinally rearward of said leading edge;
   a continuous lower surface extending from said leading edge to said trailing edge, said lower surface defining a lower camber;
   a first upper surface extending rearwardly from said leading edge, said first upper surface defining a first upper camber portion;
   a second upper surface extending rearwardly of said first upper surface, said second upper surface being a substantially continuous impermeable member defining a second upper camber portion;
   at least a third upper surface intersecting said second upper surface and extending rearwardly therefrom, said third upper surface defining a third upper camber portion, said intersection representing an abrupt, significant change in the disposition of each said second and said third upper surfaces so as to define a visible demarcation therebetween; and,
   means for producing an aerodynamic discontinuity, said means for producing being a substantially continuous impermeable member interposed between said first upper surface and said second upper surface.

8. An airfoil according to claim 7, in which said means for producing is an offset.

9. An airfoil according to claim 8, in which said second upper surface has a forward end elevationally displaced from said first upper surface.

10. An airfoil according to claim 9, in which said offset is a substantially vertical surface extending from said first upper surface to said second upper surface.

11. An airfoil according to claim 7, in which said third upper surface represents a continuation of said first upper surface.

12. An airfoil according to claim 7, in which said second upper surface is substantially planar.

13. An airfoil according to claim 7, in which said first upper surface defines a positive camber.

14. An airfoil according to claim 7, in which said third upper surface defines a positive camber.

15. A lifting body comprising:
a leading edge;
a trailing edge located longitudinally rearward of said leading edge;
a continuous lower surface extending from said leading edge to said trailing edge, said lower surface defining a lower camber;
a first upper surface extending rearwardly from said leading edge and terminating in at least one offset forwardly of said trailing edge, said first upper surface defining a first upper camber portion;
a second upper surface extending rearwardly from a said offset, said second upper surface defining a second upper camber portion; and,
at least a third upper surface intersecting said second upper surface and extending rearwardly therefrom, said third upper surface defining a third upper camber portion, said intersection representing an abrupt, significant change in the disposition of each said second and third upper surfaces so as to define a visible demarcation therebetween;
said offset and said second upper surface each being substantially continuous impermeable members.

16. A lifting body according to claim 15, in which said second upper surface has a forward end elevationally displaced below said first upper surface at said offset.

17. A lifting body according to claim 16, in which said third upper surface represents a continuation of said first upper surface.

18. A lifting body according to claim 17, in which said offset is a substantially vertical surface extending from said first upper surface to said second upper surface.

19. A lifting body according to claim 18, in which said second upper surface is substantially planar.

20. A lifting body according to claim 18, in which said second upper surface defines a negative camber.

21. A lifting body comprising:
a leading edge;
a trailing edge located longitudinally rearward of said leading edge;
a continuous lower surface extending from said leading edge to said trailing edge, said lower surface defining a lower camber;
a first upper surface extending from said leading edge to said trailing edge, said first upper surface defining an upper camber;
at least one substantially continuous impermeable offset carried by said first upper surface forwardly of said trailing edge; and,
a substantially continuous impermeable second upper surface extending rearwardly from said offset toward said first upper surface and intersecting said first upper surface forwardly of said trailing edge;
wherein said intersection represents an abrupt, significant change in the disposition of said second upper surface relative to said first upper surface so as to define a visible demarcation therebetween.

22. A lifting body according to claim 21, in which said second upper surface has a forward end elevationally displaced below said upper surface at said offset.

23. A lifting body according to claim 32, in which said offset is a substantially vertical surface extending from said first upper surface to said second upper surface.

24. A lifting body according to claim 23, in which said second upper surface is substantially planar.

25. A lifting body according to claim 23, in which said second upper surface defines a negative camber.

* * * * *

UNITED STATES PATENT AND TRADEMARK OFFICE
CERTIFICATE OF CORRECTION

PATENT NO. : 4,606,519

DATED : August 19, 1986

INVENTOR(S) : Demeter G. Fertis and Larry Lee Smith

It is certified that error appears in the above-identified patent and that said Letters Patent are hereby corrected as shown below:

Col. 2, Line 41, delete "chamber" and substitute therefor --camber--.

Col. 10, Line 29, delete the numeral "32" and substitute therefor --22--.

On the first page of the soft copy under the listing "Other Publications", second entry, correct the title "Lift and Drag Coefficients of a Semi-Wedge Airfoir" to properly read "Lift and Drag Coefficients of a Semi-Wedge Airfoil".

Signed and Sealed this

Eleventh Day of November, 1986

Attest:

DONALD J. QUIGG

Attesting Officer

Commissioner of Patents and Trademarks